United States Patent
Brignole

(10) Patent No.: US 11,280,212 B2
(45) Date of Patent: Mar. 22, 2022

(54) GUIDE VANE CASCADE FOR A TURBOMACHINE

(71) Applicant: MTU Aero Engines AG, Munich (DE)

(72) Inventor: Giovanni Brignole, Munich (DE)

(73) Assignee: MTU Aero Engines AG, Munich (DE)

( * ) Notice: Subject to any disclaimer, the term of this patent is extended or adjusted under 35 U.S.C. 154(b) by 98 days.

(21) Appl. No.: 16/749,432

(22) Filed: Jan. 22, 2020

(65) Prior Publication Data
US 2020/0240283 A1     Jul. 30, 2020

(30) Foreign Application Priority Data
Jan. 24, 2019   (DE) ................ 10 2019 200 885.2

(51) Int. Cl.
*F01D 17/16*     (2006.01)
*F01D 5/14*      (2006.01)

(52) U.S. Cl.
CPC ............ *F01D 17/16* (2013.01); *F01D 5/146* (2013.01); *F01D 17/162* (2013.01); *F05D 2240/125* (2013.01); *F05D 2240/129* (2013.01)

(58) Field of Classification Search
CPC ........ F01D 17/16; F01D 17/162; F01D 5/146; F01D 5/141; F01D 9/041; F05D 2240/125; F05D 2240/129; F05D 2240/121; F05D 2240/122; Y02T 50/60
See application file for complete search history.

(56) References Cited

U.S. PATENT DOCUMENTS

| | | | | |
|---|---|---|---|---|
| 3,588,270 A | * | 6/1971 | Boeks ................... | F04D 29/462 415/162 |
| 4,558,987 A | * | 12/1985 | Dittie ..................... | F01D 5/146 415/162 |
| 4,652,208 A | * | 3/1987 | Tameo ................... | F01D 5/146 415/148 |

(Continued)

FOREIGN PATENT DOCUMENTS

| DE | 6928037 U | 11/1970 |
|---|---|---|
| DE | 102011000182 A1 | 7/2011 |

(Continued)

OTHER PUBLICATIONS

"Enhanced Compressor Distortion Tolerance Using Asymmetric Inlet Guide Vane Stagger", Massachusetts Institute of Technology Master Thesis, Schulmeyer, Andreas, 1989.

*Primary Examiner* — David E Sosnowski
*Assistant Examiner* — Wayne A Lambert
(74) *Attorney, Agent, or Firm* — Barlow, Josephs & Holmes, Ltd.; David R. Josephs

(57) ABSTRACT

The present invention relates to a guide vane cascade for a turbomachine, which has guide vanes that are mounted adjustably about an axis of rotation, so as to change an inflow angle each time, wherein a first guide vane and a second guide vane arranged on the pressure side thereof, referred to a longitudinal axis of the turbomachine, are arranged with an axial offset, namely, the axis of rotation of the second guide vane is offset axially toward the back, wherein the first guide vane and the second guide vane are provided such that, in an adjusted state, they form together a tandem configuration in a radially outer region but together they delimit a divergent channel in a radially inner region.

15 Claims, 4 Drawing Sheets

(56) References Cited

U.S. PATENT DOCUMENTS

| | | | | |
|---|---|---|---|---|
| 4,874,289 | A * | 10/1989 | Smith, Jr. | F04D 29/563 415/150 |
| 4,989,406 | A * | 2/1991 | Vdoviak | F01D 25/162 60/762 |
| 6,350,103 | B1 * | 2/2002 | Hashimoto | F01D 5/146 415/199.5 |
| 6,715,983 | B2 * | 4/2004 | Koshoffer | F01D 9/04 415/1 |
| 8,534,997 | B2 * | 9/2013 | Guemmer | F04D 29/563 415/181 |
| 8,672,618 | B2 * | 3/2014 | Guemmer | F04D 29/644 415/162 |
| 9,303,513 | B2 * | 4/2016 | Gomez | F01D 1/04 |
| 9,422,864 | B2 * | 8/2016 | Sakekar | F01D 9/041 |
| 9,453,423 | B2 * | 9/2016 | Gomez | F04D 29/544 |
| 9,951,635 | B2 * | 4/2018 | Guemmer | F01D 9/00 |
| 10,113,430 | B2 * | 10/2018 | Guemmer | F01D 5/146 |
| 2004/0101405 | A1 * | 5/2004 | Turner | F01D 5/141 415/194 |
| 2010/0260591 | A1 * | 10/2010 | Martin | F04D 29/563 415/1 |
| 2014/0044518 | A1 * | 2/2014 | Wunderer | F01D 5/141 415/1 |

FOREIGN PATENT DOCUMENTS

| | | | |
|---|---|---|---|
| EP | 0043452 | A2 | 1/1982 |
| EP | 259221 | A * | 8/1987 |
| EP | 0384706 | B1 | 8/1990 |
| EP | 0978632 | A1 | 2/2000 |
| EP | 1077310 | A1 * | 2/2001 ............ F01D 5/141 |
| EP | 1424467 | A2 | 6/2004 |
| EP | 2189664 | A2 | 5/2010 |
| EP | 2696042 | A1 | 2/2014 |
| EP | 2913478 | A1 | 9/2015 |
| GB | 2568109 | A | 5/2019 |

* cited by examiner

GUIDE VANE CASCADE FOR A TURBOMACHINE

BACKGROUND OF THE INVENTION

The present invention relates to a guide vane cascade for a turbomachine.

The turbomachine may involve a jet engine, for example, e.g. a turbofan engine. Functionally, the turbomachine is divided into compressor, combustion chamber, and turbine. Roughly speaking, in the case of the jet engine, aspirated air is compressed by the compressor and is combusted in the downstream combustion chamber with kerosene mixed in. The arising hot gas, a mixture of combustion gas and air, flows through the downstream turbine and is thereby expanded. In this case, the turbine also withdraws energy proportionally from the hot gas in order to drive the compressor.

The present subject matter is directed to a guide vane cascade that can be employed, in particular, in a compressor or compressor module. It has adjustable guide vanes; thus, the individual guide vanes are mounted adjustably about an axis of rotation, so as to change an inflow angle in each case. The adjustment angle can change dependent on load and may be greater, for example, under partial load. Such a guide vane cascade is also called an adjusted cascade.

SUMMARY OF THE INVENTION

The technical problem that is the basis of the present invention is to provide a particularly advantageous guide vane cascade having adjustable guide vanes.

This problem is solved according to the invention with the guide vane cascade according to the present invention. This cascade has a first guide vane, and, on the pressure side thereof, has a second guide vane that is arranged axially offset. The axis of rotation of the second guide vane is offset axially toward the back opposite the axis of rotation of the first guide vane. Further, the first and the second guide vanes are matched with respect to their vane body profile and/or their adjustment angle in such a way that, in an adjusted state, they form together a tandem configuration in a radially outer region;

however, together they delimit a divergent channel in a radially inner region.

In comparison to a conventional guide vane cascade without axial offset, this arrangement can be of advantage with a view to the downstream rotating blade cascade. That is, conventionally, under partial load there, an unfavorable mass flow distribution or a mass flow defect can arise radially outside, which increases the load of the rotating blade cascade. The present approach thus aims at bringing about a distribution radially outward due to an aerodynamically more unfavorable configuration of the guide vane cascade radially inside. In the radially inner region, first and second guide vanes form a divergent channel, the latter representing a diffusor. Radially inner interface loading and blockage or profile losses will be correspondingly high. In comparison, the tandem configuration that the guide vanes form radially outside is more favorable aerodynamically. As a result, this leads to a proportional displacement of the mass flow radially outward.

Preferred embodiments are discussed in detail below and the entire disclosure, wherein, in the presentation of the features, a distinction is not always made in the individual case between device or use aspects; in any case, the disclosure should be read implicitly. In the scope of this disclosure, "a" and "one", unless expressly indicated otherwise, are to be read as the indefinite article and thus also are always to be read as "at least a" or "at least one". The guide vane cascade may have, for example, in each case, a plurality of first guide vanes and a plurality of second guide vanes; preferably, it is constructed exclusively of first and second guide vanes that are arranged following one another circumferentially in an alternating manner.

The adjustment or adjustment angle specified below for the guide vane refer to the axis of rotation thereof. All remaining indications such as "axially", "radially" and "circumferentially" as well as the directions belonging thereto, in contrast, refer to the longitudinal axis of the turbomachine that coincides, for example, with an axis of rotation of the rotating blade cascade or rotors. The radially inner region lies at the hub, and the radially outer region at the housing. The configuration according to the present invention refers to the adjusted state, in which the guide vanes are deflected by an adjustment angle (see below in detail). In the unadjusted state, the guide vane cascade is preferably not deflecting in both the radially inner region as well as in the radially outer region; a redistribution of the mass flow from inside radially to radially outside does not occur.

The divergent channel in the radially inner region is formed between a pressure side surface of the first guide vane and a suction side surface of the second guide vane. Observed in a profile section, these side surfaces run out from one another in the flow direction; they form a diffusor. The surface of the profile section in this case is a circumferential surface, which extends axially and circumferentially. A corresponding divergent channel can be present, for example, at least in the inner 20%, 30% or 40% of the radial height of the vane body (with a possible upper limit of, e.g., at most 60%).

In the radially outer region, the guide vanes form the tandem configuration; figuratively speaking, the flow "sees" the two vanes there as a single vane. The vanes preferably delimit there a convergent channel; the side surfaces just mentioned thus run together when observed in a profile section. A corresponding tandem configuration can be present, for example, at least in the outer 20% (thus, between 80% and 100%), 30% or 40% of the radial height of the vane body (with a possible upper limit of, e.g., at most 60%).

In a preferred embodiment, the guide vanes are distinguished by their vane body profiles in at least one of the regions, and preferably in both regions. Effectively, an embodiment is preferred wherein the first guide vane has a longer camber line radially outside than does the second guide vane, and/or the second guide vane has a longer camber line radially inside than does the first guide vane. The respective longer camber line, for example, can be at least 20%, 30% or 40% longer than the shorter camber line, and (independently thereof) possibly with upper limits of e.g., at most 80%, 70% or 60% (in each case, with increasing preference in this sequence). Here, the percent values are taken each time at the place where the difference in length is maximal, thus usually directly at the hub (0% of the height of the vane body and directly at the housing (100% of the height of the vane body). In a middle region, e.g., between 40% and 80%, the profile shapes can be largely identical.

According to a preferred embodiment, the trailing edges of the guide vanes lie essentially without offset in the radially outer region. An approximate axial offset therebetween, for example, shall amount to at most ¼ of the offset between the axes of rotation of the guide vanes, wherein at most ⅛ is further preferred, and 1/10 is particularly preferred.

Thus, in all cases, a small offset or actually almost no offset can be found between the trailing edges.

In the radially inner region, in contrast, the leading edges are preferably arranged essentially without offset. Reference is made to the quantitative indications in the previous paragraph (at most ¼, ⅛ or 1⁄10 of the offset between the axes of rotation, or also almost no offset. The radially inner leading edges without offset of the guide vanes are next to one another in the flow, figuratively speaking: they are "seen" as two separate vanes. Radially outside, the second guide vane that is offset toward the back, in contrast, can "cling" to a trailing edge region of the first guide vane.

In general, the axial offset between the axes of rotation of the first and second guide vanes, for example, can amount to at least 10% or 20% of a mean camber line length, which is produced as the mean value of the lengths of the camber lines of the first and second guide vanes taken at the mid-height (50%) of the vane body. Possible upper limits of the axial offset, for example, can lie at most at 70%, 60% or 50% of the mean camber line length.

According to a preferred embodiment, the first and the second guide vanes differ in their adjustment angles in the adjusted state. That of the second guide vane may be, for example, at least 20% or 30% greater than that of the first guide vane, wherein (independently therefrom), possible upper limits may lie, for example, at most at 60% or 50%.

The adjustment angle for each guide vane is taken relative to a plane that contains the axis of rotation of the respective guide vane and lies parallel to the axial direction of the turbomachine. In general, the adjustment angle by which the guide vanes are adjusted in the adjusted state preferably lie at least at 30°, whereby at least at 40° is further preferred, and at least at 50° is particularly preferred. Possible upper limits (independently therefrom) lie, for example, at 70° or 60° at most. Within this region, the adjustment angle of the second guide vane can then be greater than that of the first, which, for example, can be achieved in one arrangement on the same actuator ring due to the different distances, and thus levers of different lengths.

Despite the axial offset, the axes of rotation of the first and second guide vanes lie in a projection preferably parallel to one another, and, in fact, in a projection in an axial plane. The latter includes the longitudinal axis of the turbomachine; the axes of rotation are projected in the circumferential direction in this plane.

According to a preferred embodiment, the first guide vane and another second guide vane that is arranged on the suction side thereof together delimit a divergent channel in the radially inner region. This channel can intensify the aerodynamically unfavorable situation radially inside and thus reinforce the redistribution radially outward.

The invention also relates to a compressor module having a presently disclosed guide vane cascade. Downstream to this, the module has a rotating blade cascade, the inflow to which is improved (see above).

Further, the invention relates to an aircraft engine having such a compressor module or guide vane cascade.

BRIEF DESCRIPTION OF THE DRAWINGS

The invention will be explained in more detail in the following on the basis of an example of embodiment, wherein the individual features in the scope of the coordinated independent claims can also be essential to the invention in other combinations.

Taken individually.

DESCRIPTION OF THE INVENTION

Figure 1:
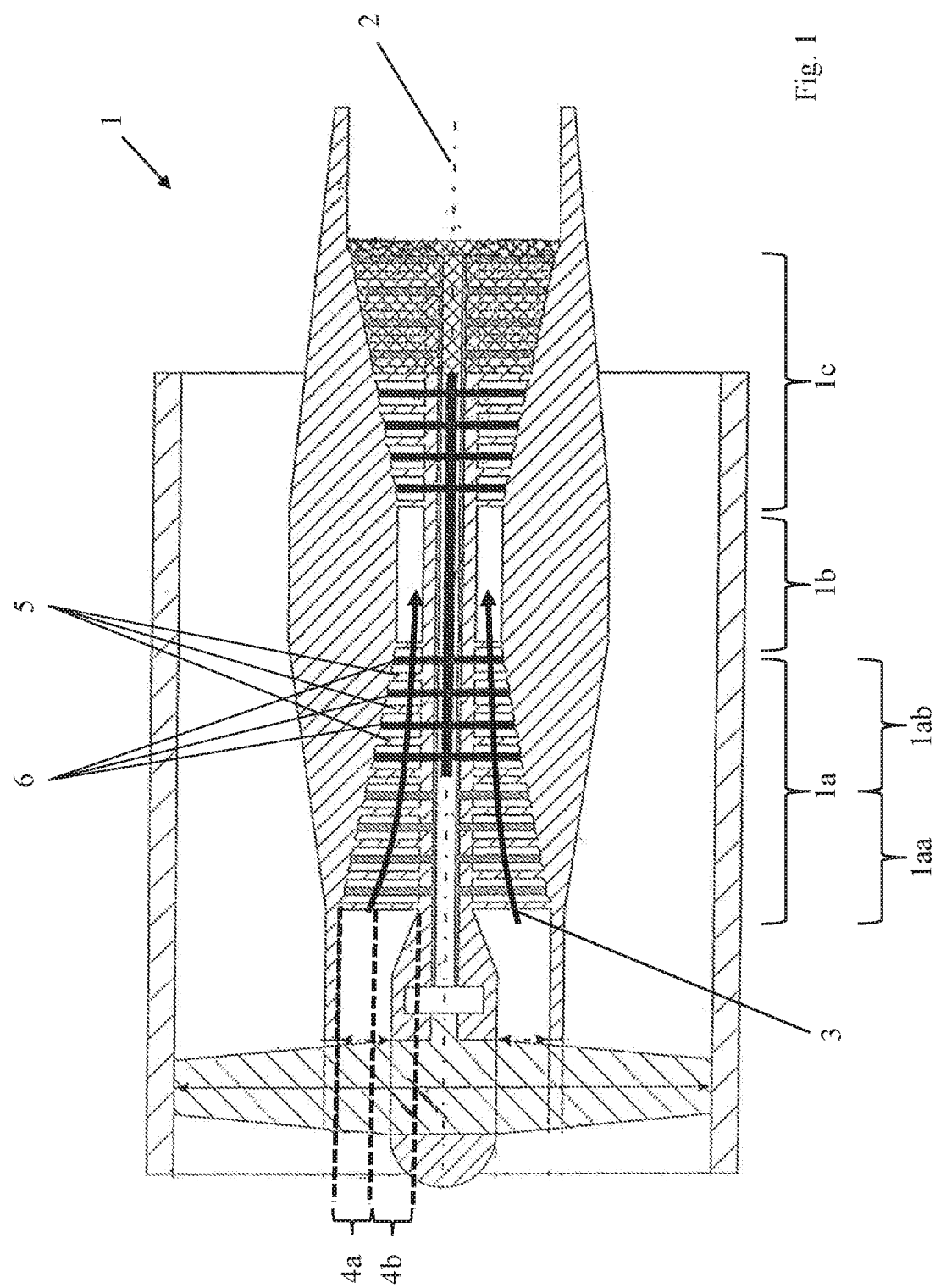
FIG. 1 shows an aircraft engine in a schematic axial section.

FIG. 1 shows a turbomachine 1 in section, concretely a jet engine (turbofan engine). The turbomachine 1 is functionally divided into compressor 1a, combustion chamber 1b, and turbine 1c. Both the compressor 1a as well as the turbine 1c are each constructed from several modules, the compressor 1a presently from a low-pressure compressor 1aa and a high-pressure compressor 1ab. Each compressor 1aa, 1ab is in turn constructed of several stages, each stage usually being composed of a guide vane cascade 5 and a rotating blade cascade 6. During operation, the compressor gas 3, air in the present case, flows through the compressor 1a axially, referred to a longitudinal axis 2.

Figure 2:
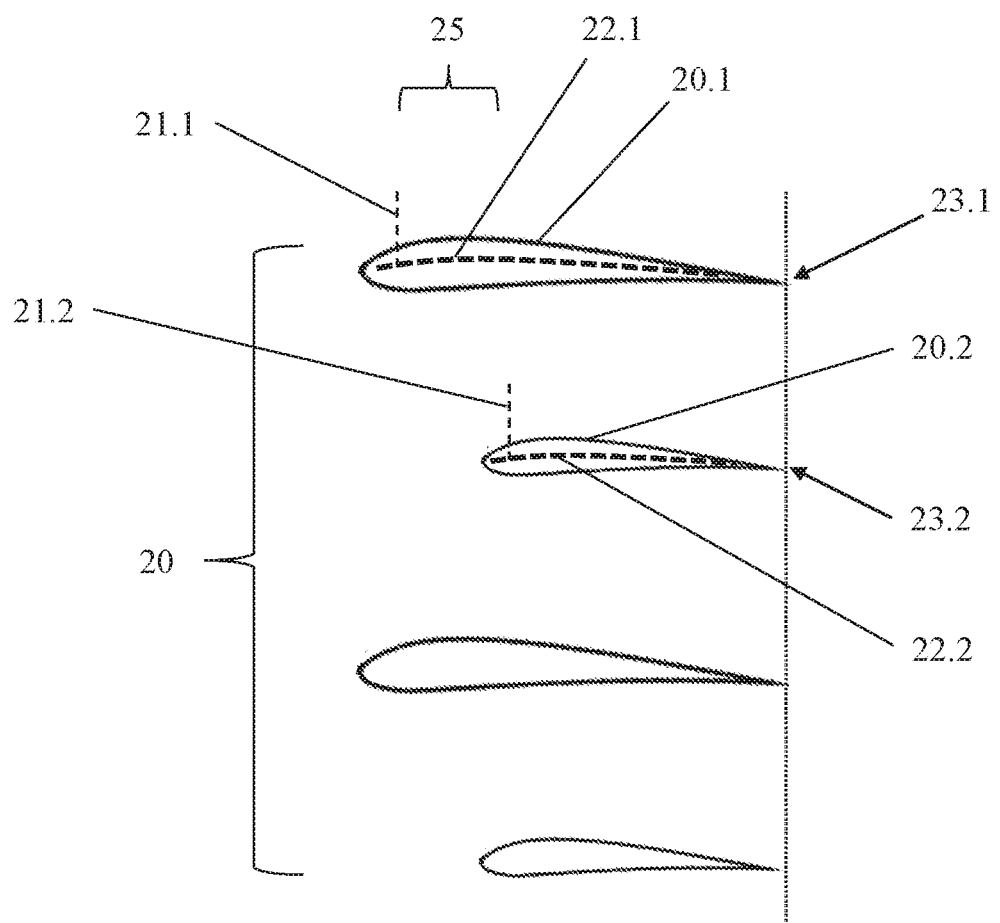
FIG. 2 shows a profile section through a guide vane cascade according to the invention in an unadjusted state in a radially outer region.
Figure 4:
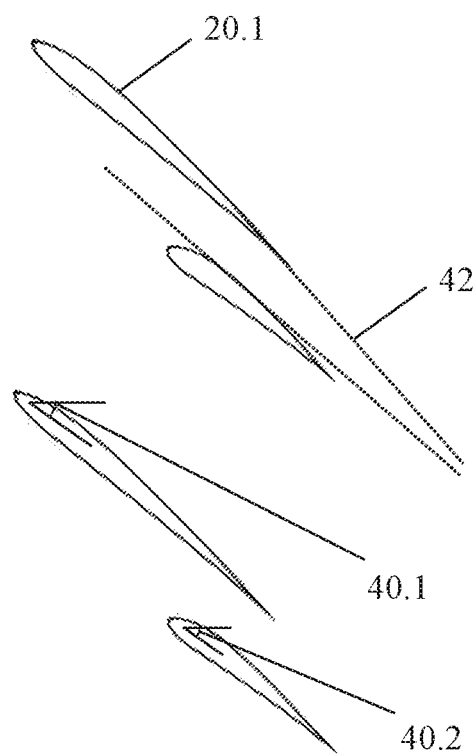
FIG. 4 shows a schematic profile section of the guide vane cascade analogous to FIG. 2, but in an adjusted state.

FIG. 2 shows an excerpt of a guide vane cascade 5, namely a plurality of guide vanes 20 in a profile section. The sectional surface lies radially in a radially outer region 4a (see FIG. 1), thus at the housing. The guide vane cascade 5 is constructed from first guide vanes 20.1 and second guide vanes 20.2, each of which are mounted adjustably, wherein the unadjusted state is shown in FIG. 2, (the adjusted state is shown in FIG. 4).

The first and second guide vanes 20,1, 20.2 are arranged with an axial offset 25, an axis of rotation 21.2 of the second guide vane 20.2 being axially offset toward the back when compared with an axis of rotation 21.1 of the first guide vane. Further, a camber line 22.1 of the first guide vane 20.1 is longer in the radially outer region 4a than a camber line 22.2 of the second guide vane 20.2. The trailing edges 23.1, 23.2 lie at approximately the same axial level.

Figure 3:
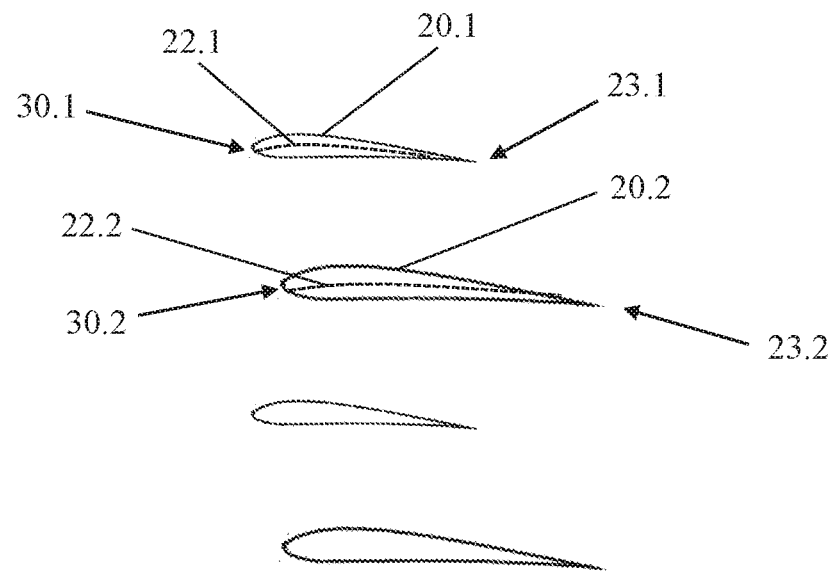
FIG. 3 shows a schematic profile section through a guide vane cascade according to the invention in an unadjusted state in a radially inner region.

FIG. 3 shows a profile section in a radially inner region 4b (see FIG. 1), thus at the hub. The trailing edges do not lie there, but rather the leading edges 30.1, 30.2 lie there at approximately the same level, the trailing edges 23.1, 23.2, in contrast, being offset. Further, the camber line 22.1 of the first vane 20.1 is shorter than that of the second vane 20.2 in the radially inner region.

FIGS. 2 and 3 show, as mentioned, the unadjusted state, the guide vanes 20 not being rotated. In this situation, the axial offset and the different profile forms have no additional influence on the flow through the guide vane cascade; an influence is shown only in the rotated state.

FIG. 4 illustrates this rotated, adjusted state for the radially outer region 4a. An adjustment angle 40.1, 40.2 of the first and second guide vanes 20.1, 20.2 each lie here at approximately 60° (adjustment angles of different sizes are also possible; see the introduction to the description). Based on the axial offset 25 between the axes of rotation 21.1, 21.2 and the profile differences depicted on the basis of FIG. 2, the second guide vane 20.2 fits snugly at the trailing edge region of the first guide vane 20.1. The two guide vanes 20.1, 20.2 form a tandem configuration, delimiting a convergent channel 42.

Figure 5:
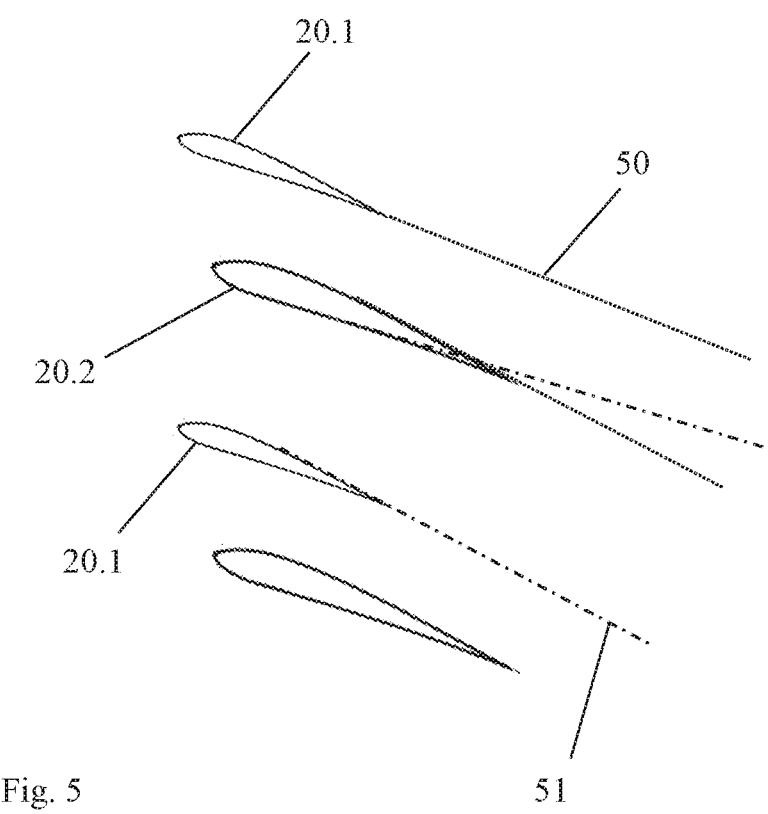
FIG. 5 shows a schematic section of the guide vane cascade analogous to FIG. 3, but in an adjusted state.

FIG. 5 illustrates the situation in the radially inner region for the same adjustment angles 40.1, 40.2. The two guide vanes 20.1, 20.2 delimit there a divergent channel 50. Further, there is also a divergent channel 51 between the first guide vane 20.1 and the second guide vane 20.2 arranged on the suction side thereof. Aerodynamically, the constellation is poorer radially inside than radially outside, the interface load being higher radially inside. As a consequence, there is a proportional redistribution of the mass flow radially outward. Compared with a conventional cascade without axial offset and vane adjustment, the mass flow is thus increased radially outside, which is of advantage with respect to the downstream rotating blade cascade 6; see the introduction to the description.

What is claimed is:

1. A guide vane cascade for a turbomachine, comprising:
a plurality of guide vanes each are mounted adjustably about a respective axis of rotation, so as to change an inflow angle when rotated about the respective axis of rotation,
wherein a first guide vane of the plurality of guide vanes and a second guide vane of the plurality of guide vanes, arranged on the pressure side of the first guide vane, each extend along a longitudinal axis of the turbomachine and the first guide vane and second guide vane are arranged with an axial offset, wherein, the axis of rotation of the second guide vane is offset axially downstream of the axis of rotation of the first guide vane,
wherein the first guide vane and the second guide vane are provided such that, in an adjusted state, they form together a tandem configuration delimiting s convergent channel in a radially outer region; and together they delimit a divergent channel in a radially inner region, and
wherein the mass flow at the radially outer region is different than the mass flow at the radially inner region in the adjusted state.

2. The guide vane cascade according to claim 1, wherein the first and the second guide vanes differ in their vane body profile in at least one of the radially outer region and the radially inner region.

3. The guide vane cascade according to claim 2, wherein the first guide vane has a longer camber line than a camber line of the second guide vane in the radially outer region.

4. The guide vane cascade according to claim 3, wherein the camber line of the first guide vane is at least 20% longer than the camber line of the second guide vane in the radially outer region.

5. The guide vane cascade according to claim 2, wherein the second guide vane has a longer camber line than a camber line of the first guide vane in the radially inner region.

6. The guide vane cascade according to claim 5, wherein the camber line of the second guide vane is at least 20% longer than the camber line of the first guide vane in the radially inner region.

7. The guide vane cascade according to claim 2, wherein, in the radially outer region, a trailing edge of the first guide vane and a trailing edge of the second guide vane are arranged axially offset by at most ¼ of the axial offset between the axes of rotation of the first and the second guide vanes.

8. The guide vane cascade according to claim 2, wherein, in the radially inner region, a leading edge of the first guide vane and a leading edge of the second guide vane are arranged axially offset by at most ¼ of the axial offset between the axes of rotation of the first and the second guide vanes.

9. The guide vane cascade according to claim 1, wherein the first and the second guide vanes, in the adjusted state, are adjusted by adjustment angles of different sizes.

10. The guide vane cascade according to claim 9, wherein the adjustment angle of the second guide vane, in the adjusted state, is at least 20% greater than the adjustment angle of the first guide vane.

11. The guide vane cascade according to claim 1, wherein a respective adjustment angle by which the guide vanes are adjusted and in the adjusted state amounts to at least 30° in each case.

12. The guide vane cascade according to claim 1, wherein the axes of rotation of the first and of the second guide vanes lie parallel to one another in a projection in a circumferential direction in an axial plane.

13. The guide vane cascade according to claim 1, wherein the first guide vane and another second guide vane that is arranged on a suction side of the first guide vane together delimit a divergent channel in the radially inner region.

14. The guide vane cascade according to claim 1, wherein the guide vane cascade is configured and arranged in a compressor module.

15. The guide vane cascade according to claim 14, wherein the compressor module is configured and arranged in an aircraft engine.

\* \* \* \* \*